United States Patent [19]

Sirlin

[11] 4,111,696

[45] Sep. 5, 1978

[54] COMPOSITE IMAGE DESIGN METHOD

[76] Inventor: Jerome Sirlin, Ithaca, N.Y.

[21] Appl. No.: 653,308

[22] Filed: Jan. 29, 1976

[51] Int. Cl.$^2$ .......................... G03C 5/04; G03C 5/06
[52] U.S. Cl. ........................................ 96/42; 96/41;
 96/43; 96/44; 35/53; 353/30; 353/31
[58] Field of Search ..................... 96/27 R, 41, 42, 43,
 96/44; 35/27, 28, 53; 353/28, 30, 31; 33/253

[56] References Cited

U.S. PATENT DOCUMENTS

| | | | |
|---|---|---|---|
| 1,737,021 | 11/1929 | Pollock | 96/41 |
| 2,028,975 | 1/1936 | Gillette | 96/41 |
| 3,784,380 | 1/1974 | Compare | 96/44 |
| 3,902,901 | 9/1975 | Vogel | 96/41 X |

*Primary Examiner*—Edward C. Kimlin

[57] ABSTRACT

A method of visually portraying an image of an assumed scene comprising portions of each of a plurality of scenes. Photographs, preferably in the form of transparent slides, are made of a relatively large number of diverse scenes. Portions are selected from each of two or more slides for combination to form the assumed scene. The composite scene is recorded in a single photograph by making repeated exposures of a single frame of film as the images are sequentially projected with their corresponding masks positioned on the viewing surface. All except the selected portions are covered by opaque masks as the individual images are projected sequentially on the single viewing surface. Images of all of the selected slides are projected simultaneously, in superposed relation on a single viewing surface while necessary adjustments are made in the position, size and illumination of the individual transparencies to bring each of the selected portions into the desired relationship to form the composite image of the assumed scene.

5 Claims, 9 Drawing Figures

COMPOSITE IMAGE DESIGN METHOD

BACKGROUND OF THE INVENTION

The present invention relates to methods of presenting images of assumed scenes made up of a plurality of selected portions of real-world scenes, and more particularly to methods of graphic design involving visual representations comprising a combination of portions of several existing structures or scenes.

In architectural and environmental design, the most common means of visually expressing a design concept is that known as the architectural rendering. While such graphic depictions have over the years served to convey the designer's ideas for proposed new or altered structures or other areas of environmental design, certain disadvantages are immediately apparent. For example, the rendering can never be more than an abstraction of the original ideas since the actual object or scene does not yet exist. Also, the fidelity of the rendering is dependent in large part on the graphic skills and expressive capabilities of the designer.

A further limitation inherent in a drawing or rendering is the "architectural vocabulary" of the designer. That is, vague or redundant architectural cliches such as lighting fixtures, store graphics, fountains and sculpture tend to appear time and again in the renderings of many designers. If the designer's vocabulary is limited to contemporary methods of architectural expression and graphic techniques, then his projects will reflect these limitations. The designer's capacity for integrating, in a comprehensive manner, large amounts of new, unexplored visual information presents a further limitation on the efficacy of his graphic renderings. Traditional graphic techniques and methods of expression limit the designer's ability to deal effectively with large quantities of new information.

Past attempts to provide more effective methods of dealing with design problems have included superposing graphic renderings of proposed alterations or additions with an actual structural as seen through a viewing device, as disclosed in U.S. Pat. No. 2,861,357. Also, such things as various colors or exterior textures may be illustrated for ease of visualization by superposition of filters or overlays with drawings or photographs of proposed or existing structures, or the like. Similar techniques have also been applied to fields other than architectural or environmental design as, for example, in U.S. Pat. Nos. 2,336,508 and 3,336,681. In the former, a viewing system is provided for superposing images, primarily for theatrical purposes, to permit the combination of various foregrounds and backgrounds. In the latter, a plurality of transparent slides are superposed to construct a composite image of facial features which may be varied by changing one or more of the slides being projected to a slide with a different content. None of the aforementioned systems, however, provides for the combination of any selected portions of prerecorded scenes into a composite scene by superposition of images having portions selectively masked from view.

It is a principal object of the present invention to provide a novel method of presenting visual displays of proposed designs in the architectural and environmental fields.

A further object is to provide an architectural design method whereby features of existing structures and actual scenes may be combined in a visual display to create novel, yet precisely defined effects.

Another object is to provide a method of visually presenting architectural and environmental designs without reliance entirely upon graphic renderings.

Other objects will in part be obvious and will in part appear hereinafter.

SUMMARY OF THE INVENTION

In accordance with the foregoing objects, the invention contemplates the collection of a library of photographs of a wide variety of structures and other architectural features, as well as scenes of general outdoor or indoor areas and natural surroundings. The library consists of a rather large number, e.g., several thousand, photographs taken and developed in purely conventional fashion, preferably in the form of transparent slides.

In approaching a design problem according to the present invention, the photographs are individually inspected to select two or more having portions which may be combined to produce a novel, interesting, functional, or otherwise potentially desirable design concept. Images of the selected photographs are projected in superposed relation on a single viewing surface and the size, location and illumination of each image relative to the others is adjusted to bring the selected portions into the desired relationship.

Opaque masks are then constructed for each image for placement upon the viewing surface to obscure all of the corresponding image except the portions selected for inclusion in the composite scene. The images are then projected one at a time on the viewing surface and the corresponding mask placed thereon. A camera is appropriately positioned and focused upon the viewing surface to photograph the images displayed thereon. At each image is projected and its corresponding mask positioned on the viewing surface, the same frame of film is sequentially exposed to record the portion of each image visible through its associated mask. Thus, the selected portions of each photograph are included in a single photograph which, when developed, provides a tangible and completely objective composite scene showing the design including each of the selected portions from the plurality of diverse, real-world scenes in the individual photographs.

DETAILED DESCRIPTION

Figure 3:
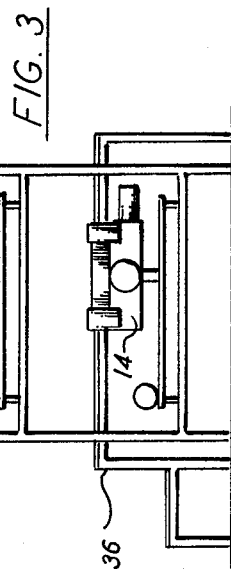
FIG. 3 is a plan view of the apparatus.
Figure 1:
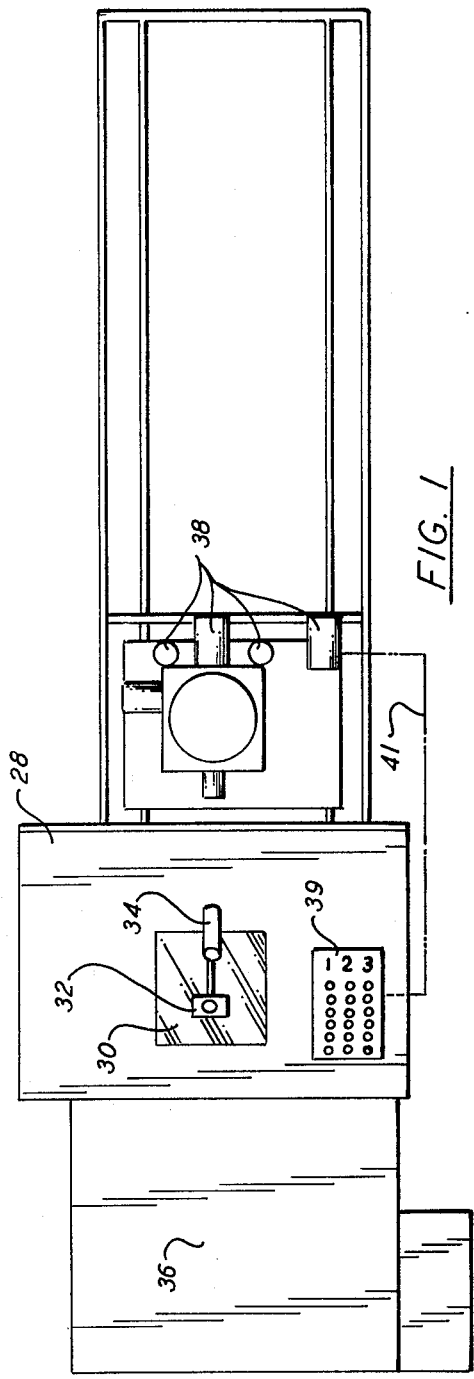
FIG. 1 is a fragmentary, side elevational view, in diagrammatic form, of a typical form of apparatus used in practising the invention.
Figure 2:
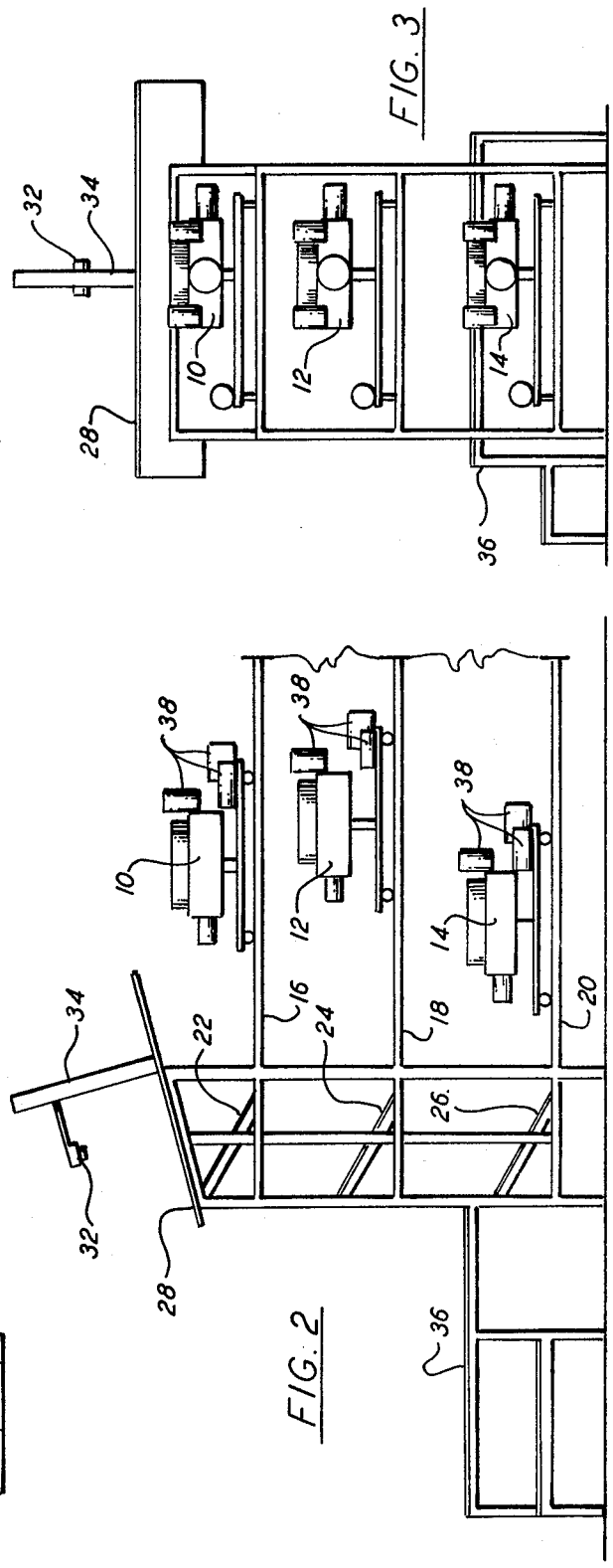
FIG. 2 is an end elevation of the apparatus of FIG. 1.

Referring now to the accompanying drawings, in FIGS. 1-3 is shown an exemplary form of apparatus which may be conveniently used in carrying out the steps of the invention. The illustrated form of the apparatus is shown somewhat diagrammatically since the invention resides in the method carried out with the assistance thereof rather than in any specific structural arrangement. Although the invention may be practiced with any number of two or more projected images, the apparatus is shown as including three projectors 10, 12 and 14, each resting upon appropriate support structure mounted for reciprocal movement upon horizontal pairs of tracks 16, 18 and 20, respectively. Projectors 10, 12 and 14 are purely conventional, commercially available items for projecting an image of a transparent slide positioned therein upon a viewing surface, and include the usual means for focusing and adjusting the intensity of illumination of the projected image.

Projectors 10, 12 and 14 are positioned to direct an image upon mirrors 22, 24 and 26, respectively, each arranged at an angle to the axis of projection of its associated projector to reflect the images upwardly. While mirror 26 may be fully reflecting, mirrors 22 and 24 are partly reflective and partly transmissive to allow images reflected from lower mirrors to pass therethrough, the three mirrors being mounted in vertical alignment. Board 28 provides a work surface and includes a central cut-out portion in which ground glass screen 30 (FIG. 3) is mounted. Images are reflected from each of mirrors 22, 24 and 26 to the lower side of screen 30 and may be viewed on the upper side. Camera 32 is mounted on column 34, properly positioned and focused to photograph the upper surface of screen 30 and images visible thereon.

Platform means 36 is provided at the forward end of the apparatus for an operator performing certain steps of the invention, as will later become apparent. Assuming two or three slides to have been selected for combination of portions of each into a composite scene or design, and to have been placed in the projectors, the operator views the superposed images projected from the slides on the upper side of screen 30. Necessary adjustments are made in the position of the projectors along the tracks and to vary their lateral and vertical position as required to bring the superposed images into the desired relative relationships of size and position. For this purpose, electric motors 38 may be provided to allow individual movement of the various projectors by manipulation of appropriate controls on a centralized panel 39, connected to the motors and projectors as indicated schematically by line 41. Panel 39 is positioned for operation by an operator standing on platform 36 and viewing the composite image on screen 30. Four motors 38 preferably are provided for each projector for movement thereof in either forward or reverse directions along the tracks, horizontally right or left, vertically up or down, and tilting up or down, by 45°. Also, controls for the projector functions of focus, illumination and on/off power are also provided on panel 39. Thus, complete remote control of the relative size, position and illumination of the individual images is provided.

Figure 4:
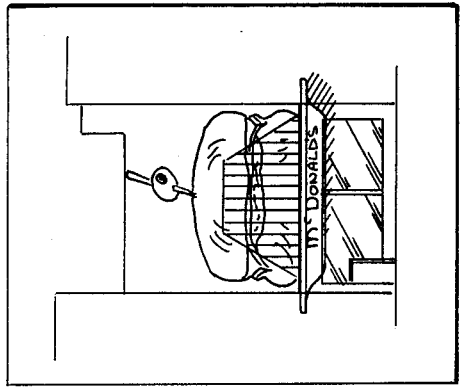
FIGS. 4-9 are a series of illustrations showing the sequence of steps involved in the invention, using two simplified photographs.

When the several images have been relatively positioned as desired by the operator, opaque masks are constructed to cover all of the surface of screen 30 except that part at which the portion of each image selected for inclusion in the final, composite image appears. This is best understood by reference to FIGS. 4-9. FIG 4 represents a photograph or slide of an existing structure, such as a store-front 40 of which design modifications are to be investigated. In the extremely simplified example of the accompanying drawings, store-front 40 is that of a fast food shop in an urban area with other buildings 42 on the sides and to the rear. The photograph shown in FIG. 5 is that of an actual sandwich 44 of a type which might be served in the establishment indicated by store-front 40.

Figure 5:
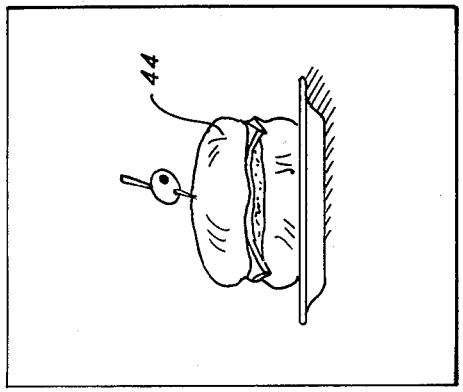

In making the design investigation of the illustrated example, the slides represented in FIG. 4 and 5 are projected simultaneously, in superposed relations, on a single viewing surface. This provides a visual indication of how the existing structure might look if the present roof or other upper structure or decorative features were replaced by an enlarged representation of sandwich 44. This is indicated in FIG. 3, which shows the superposed images as they might appear on screen 30 after the aforementioned adjustments of relative size and position of the two images.

The masks may be constructed by placing a sheet of tracing paper on screen 30 and outlining the portions of the first image which are to be included in the final, composite scene. The outline is transferred to a sheet of black construction paper, or other suitable opaque material, which is then cut to the outline, the portion retained for use with the first slide being that corresponding in size and shape to the portion of the first slide's image to be omitted from the composite scene. The procedure is repeated for the second slide, to provide an opaque mask corresponding to the portions thereof to be omitted from the composite scene. Where a third slide is used, an opaque mask is likewise constructed to correspond in size and shape to the appropriate portions of its projected image.

Figure 7:
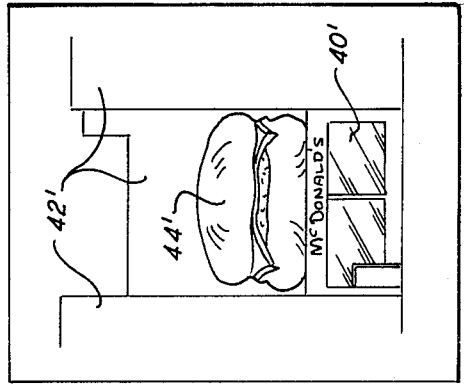

After a mask has been constructed for each slide, the first slide is projected on the viewing surface and its mask is placed on the image to cover those portions to be omitted from the composite scene. As shown in FIG. 7, mask 46 is placed on the image of the first slide to obscure the present structure on the top of store-front 40. Camera 32 is then operated to expose the film therein, recording the image and mask 46 then positioned on screen 30.

Figure 8:
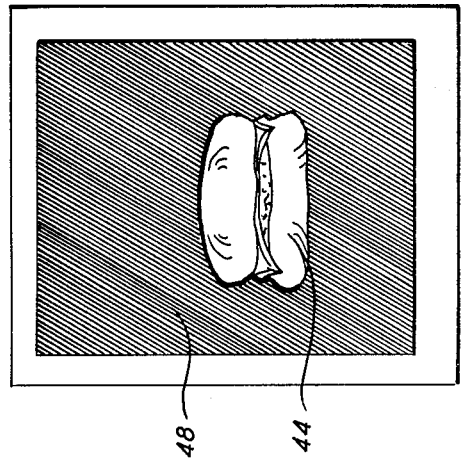
Figure 6:
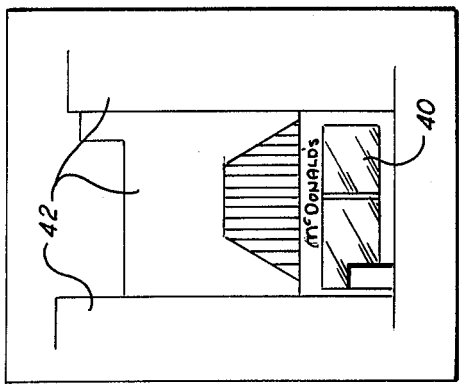
Figure 9:
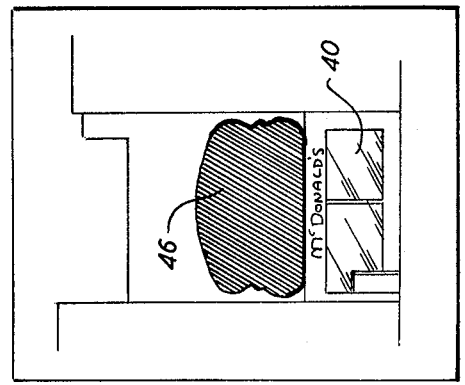

Mask 46 is then removed and an image of the second slide is projected on screen 30. Mask 48 is positioned on the viewing surface to obscure all of the second image except the portion to be included in the composite scene, as shown in FIG. 8. Camera 32 is again operated to expose the same frame of film, thus forming an image in the area where mask 46 appeared on the first exposure. Since mask 48 appears in the area where the selected portions of the first image appears on the first film exposure, this area is not again exposed to any photographic detail. Thus, upon development, the resulting new photograph will appear as indicated in FIG. 9, wherein elements from the two individual slides are indicated by reference numerals 40', 42' and 44'.

Although the preceding discussion has been directed to embodiments wherein the images on the viewing screen are provided solely by projection from transparent slides, it is also contemplated that certain graphic material may be recorded by drawing or otherwise constructed a pictorial representation on a separate sheet. In cases where a portion of such representation is to be included in the composite scene, the sheet itself is placed on screen 30 with the associated mask covering all except the selected portions. That is, rather than a projected image of the pictorial representation, the image recorded in the photograph is taken directly from the sheet bearing the representation. Thus, "pictorial representations" may include graphic recordings as well as photographs, and the image may be placed on the viewing screen for recording on the film either by projecting an image of a slide or other item positioned remotely from the screen or by placing the sheet bearing the image directly upon the viewing screen. Subject matter especially appropriate for use in the form of graphic recordings rather than photographs includes standard structural forms, grids, and the like.

It should also be apparent that all of the masks for the several individual images to be combined in the composite scene may be constructed from a single sheet. In the example of FIGS. 4–9, for example, masks 46 and 48 are obviously made by cutting out a single outline. The same condition prevails where three images and masks are used.

The masks may, of course, be constructed and used with the corresponding image by methods other than that described above. For example, after the individual masks are cut to the proper shapes, they may be attached to transparent sheets of acetate, or the like, positioned upon the viewing screen as the associated image is projected thereon. The mask may be repetitively positioned in exactly the same location by providing fixed pins, or other locating devices, adjacent the viewing screen for cooperative engagement with the acetate sheet.

Another method of mask construction involves cutting the masks from a single sheet of material of the type used in silk screen printing as it is positioned upon the viewing screen and the images are sequentially projected thereon. Since the material is slightly translucent, the images may be seen therethrough with sufficient clarity to allow accurate cutting of the masks. The individual masks are then placed upon high contrast sensitized sheets, which are exposed to produce images of the mask. A reverse print of the image on a transparent base thus provides an opaque mask of photographic material on a single sheet suitable for mounting on fixed pins in the manner previously mentioned.

Special effects may also be obtained by placing filters, screens, etc., upon the viewing surface as the exposures are made. These filters or screens may provide desired variations in color, shading, texture, etc.

What is claimed is:

1. A method of making a photograph representing a composite scene including elements of a plurality of pre-recorded scenes, said method comprising:
    making a first, relatively large, plurality of selected pictorial representations of diverse scenes;
    positioning a viewing screen at a selected location, said viewing screen having a rear projection surface and a front viewing surface;
    positioning a plurality of projectors behind said viewing screen;
    selecting a second plurality of pictorial representations of diverse scenes;
    projecting individual ones of said first and second plurality of images from individual ones of said plurality of projectors onto said viewing screen rear projection surface;
    superposing selected ones of said projected images;
    selecting a third plurality of images from said first and second plurality of images;
    projecting each of said third plurality of images from individual ones of said plurality of projectors onto said rear projection surface to be viewed on said viewing surface;
    superposing said selected images from said third plurality of images on said viewing screen;
    visually adjusting the size, position and illumination of each of said superposed, selected images relative to the others to produce a desired relationship of said images to be combined in said composite scene;
    registering a single sheet of transparent material on said viewing screen over said superposed selected images;
    drawing an outline of each of said selected superposed images on said single sheet of transparent material;
    registering a single sheet of opaque medium beneath said transparent sheet so that the outlines of said selected superposed images are superposed on said sheet of opaque medium;
    cutting out each outlined image from said single sheet of opaque medium by cutting through said transparent material;
    retaining said cut-out images in place in said single sheet of opaque medium while leaving said superposed selected images on said viewing screen beneath said opaque medium so that the images corresponding to said cut-out images are visible through said opaque medium; sequentially removing individual ones of said cut-out images from said opaque medium,
    photographically recording said selected cut-out images individually on the same frame of film by repeated exposing said same frame of film as said cut-out images are sequentially removed from said opaque medium; and
    processing said same frame of film to produce a photograph representing a composite scene composed of said selected superposed images.

2. The invention according to claim 1 wherein said first plurality is greater than one hundred and said second plurality is less than ten.

3. The invention according to claim 1 wherein at least some of said pictorial representations are transparencies images are projected on said viewing surface by a plurality of individual projectors.

4. The invention according to claim 3 wherein some of said pictorial representations are graphically recorded and are placed directly upon said viewing surface to provide said image thereof.

5. The invention according to claim 4 wherein said projectors are located remotely from said viewing screen and adjustment of the size, position and illumination of said images is effected by remote control by an operator viewing said front side of the screen.

* * * * *